US009340971B2

(12) United States Patent
Li et al.

(10) Patent No.: US 9,340,971 B2
(45) Date of Patent: May 17, 2016

(54) ADVANCED INORGANIC MATERIAL FOR REFLECTION OF ELECTROMAGNETIC WAVES

(71) Applicant: Nano and Advanced Materials Institute Limited, Hong Kong (CN)

(72) Inventors: Zongjin Li, Hong Kong (CN); Biwan Xu, Hong Kong (CN); Ye Tian, Hong Kong (CN); Honggang Zhu, Hong Kong (CN)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 133 days.

(21) Appl. No.: 13/797,951

(22) Filed: Mar. 12, 2013

(65) Prior Publication Data

US 2013/0256578 A1    Oct. 3, 2013

Related U.S. Application Data

(60) Provisional application No. 61/685,885, filed on Mar. 27, 2012.

(30) Foreign Application Priority Data

Jul. 10, 2012    (CN) .......................... 2012 1 0236577

(51) Int. Cl.
| | | |
|---|---|---|
| C04B 9/02 | (2006.01) | |
| C04B 111/00 | (2006.01) | |
| C04B 111/28 | (2006.01) | |
| C04B 28/32 | (2006.01) | |
| E04B 1/78 | (2006.01) | |
| E04B 1/76 | (2006.01) | |
| E04B 1/74 | (2006.01) | |

(52) U.S. Cl.
CPC . *E04B 1/78* (2013.01); *C04B 28/32* (2013.01); *E04B 1/76* (2013.01); *C04B 9/02* (2013.01); *C04B 2111/00482* (2013.01); *C04B 2111/28* (2013.01); *E04B 2001/742* (2013.01); *E04B 2001/7691* (2013.01)

(58) Field of Classification Search
CPC   C04B 2237/597;  C04B 28/32;  C04B 20/002; C04B 9/00
See application file for complete search history.

(56) References Cited

U.S. PATENT DOCUMENTS

| | | | | |
|---|---|---|---|---|
| 5,785,789 | A * | 7/1998 | Gagnon et al. ................. | 156/235 |
| 5,935,699 | A * | 8/1999 | Barber ........................... | 428/325 |
| 2005/0126441 | A1* | 6/2005 | Skelhorn ........................ | 106/409 |

OTHER PUBLICATIONS

Envirospheres. Retrieved on Jan. 3, 2015. http://www.envirospheres.com/products.asp.*

(Continued)

*Primary Examiner* — Kaj K Olsen
*Assistant Examiner* — Karam Hijji
(74) *Attorney, Agent, or Firm* — Ella Cheong Hong Kong; Sam T. Yip (57) ABSTRACT

This invention provides a composition for thermal insulation, comprising magnesium oxychloride cement (MOC) and air-filled glass or ceramic beads, and a method of preparing said composition. The composition may further comprise one or more additives selected from the group consisting of titanium dioxide, fly ash, pigment, potassium dihydrogen phosphate ($KH_2PO_4$) and sodium dihydrogen phosphate ($NaH_2PO_4$).

13 Claims, 13 Drawing Sheets

(56) References Cited

OTHER PUBLICATIONS

Halaris, M.; Zampetakis, Th. "Magnesia Cements: Over a Hundred Years Old But Still Novel". Jan. 11, 2000. Retrieved from http://www.grecianmagnesite.com/sites/default/files/Magnesite%20Cements%20-%20Presentation%20at%20Industrial%20Minerals%20Annual%20Forum%20-%20Minerals%20in%20Architectural%20Markets.pdf.*

Li, Zongjin; Chau, C.K. "Influence of molar ratios on properties of magnesium oxychloride cement". Cement and Concrete Research. 37. pp. 866-870. Mar. 31, 2007.*

"3M Scotchlite S60/10000 Series". MatWeb Material Property Data. Retrieved from http://www.matweb.com/search/datasheet.aspx?matguid=e569fa752b064d11aa68eb3f0a425a95.*

Deng, Dehua. "The mechanism for soluble phosphates to improve the water resistance of magnesium oxychloride cement". Cement and Concrete Research. vol. 33. Issue 9. pp. 1311-1317. Retrieved from http://www.sciencedirect.com/science/article/pii/S0008884603000437#.*

Chan, J.; Li, Z. "Influence of Fly Ash on the Properties of Magnesium Oxychloride Cement". Measuring, Monitoring, and Modeling Concrete Properties, pp. 347-352. 2006.*

Lang Siwei, Current Situation and Progress of Energy Efficiency Design Standards in Buildings in China, Refrigeration Air Conditioning & Electric Power Machinery, 2002, 23-3, Huadian Electric Power Research Institute.

National Statistics of the Gross Floor Area of Housing Construction in China, 2008, Statistical data of the National Bureau of Statistics of China.

487 National and Industrial Standards Reduce Consumption for the Building Industry, Report of standard and intelligent green buildings, 2008.

Statistics of National Supply of Heating in 2004, Chinese Statistical Yearbook of 2005, 2005.

Renovation Work on Beijing's Heating Supply System, Statistical Data of Development and Reform Commission of Beijing, 2009.

H. Akbari et al., ASTM E903-96: ASTM Standards for Measuring Solar Reflectance and Infrared Emittance of Construction Materials and Comparing their Steady-State Surface Temperatures, 1996.

JG/T 26-2002: Chinese Building Industry JG Standards on Inorganic building coating for external wall, 2002, 1-7, China Standard Publishing House, China.

JG/T 235-2008: Chinese Building Industry JG Standards on Architectural reflective Thermal insulation coatings, 2008, 1-11, China Standard Publishing House, China.

GB24408-2009: Chinese National GB Standard on Limit of harmful substances of exterior wall coatings, 2009, 1-24, China Standard Publishing House, China.

GB/T 21866-2008: Chinese National GB Standard on Test method and effect for antibacterial capability of paints film, 2008, 1-4, China Standard Publishing House, China.

HG/T 3950-2007: Chinese Chemical Industry HG Standard on Antibacterial coating, 2007, 1-9, China Standard Publishing House, China.

EN 1062-3:2008: European Standard on Paints and varnishes—Coating materials and coating systems for exterior masonry and concrete—Part 3: Determination of liquid water permeability, 2008, 1-6, Austrian Standards Institute, Austria.

ASTM D3363-05: Standard Test Method for Film Hardness by Pencil Test, 2005, 1-3, ASTM International, United States.

ASTM D2697: Standard Test Method for Volume Nonvolatile Matter in Clear or Pigmented Coatings, 2004, 1-3, ASTM International, United States.

ASTM C461: Standard Test Method for Mastics and Coatings Used With Thermal Insulation, 2009, 1-3, ASTM International, United States.

ASTM D3359: Standard Test Methods for Measuring Adhesion by Tape Test, 2008, 1-7, ASTM International, United States.

ASTM E84: Standard Test Method for Surface Burning Characteristics of Building Materials, 2005, 1-19, ASTM International, United States.

Building Energy Efficiency Policies in China—Executive Summary, Jul. 2012, Global Building Performance Network. ISBN: 99-10-91655-01-9.

S. Kasap et al., Springer Handbook of Electronic and Photonic Materials, 2006, 692-693, Springer.

ASTM E1175-87(2009): Standard Test Method for Determining Solar or Photopic Reflectance, Transmittance, and Absorptance of Materials Using a Large Diameter Integrating Sphere, 2009, 1-4, ASTM International, United States.

ASTM D4541-09e1: Standard Test Method for Pull-off Strength Coating Using Portable Adhesion Testers, 2009, 1-13, ASTM International, United States.

* cited by examiner

ADVANCED INORGANIC MATERIAL FOR REFLECTION OF ELECTROMAGNETIC WAVES

CROSS-REFERENCES TO RELATED APPLICATIONS

This application claims the benefit of Chinese application No. CN201210236577.3, filed Jul. 10, 2012, and U.S. Ser. No. 61/685,885, filed Mar. 27, 2012. The entire contents of these applications are incorporated herein by reference into this application.

FIELD OF THE INVENTION

This invention relates to a material formulation and reaction products having its constituents arranged in a microstructure that controls the reflection and refraction of incident electromagnetic waves according to wave reflection theory.

BACKGROUND OF THE INVENTION

For thousands of years, many attempts have been made to block the heat flow across surfaces of objects and structures for various reasons including better living environment. In fact, the development of good thermal insulation material has gained great strategic importance especially after energy crisis of the 1970s.

In recent years, China has been adding 1.7 billion m² of new floor space on an annual basis (including urban and rural areas). In 2010, the total area of existing buildings in China was approximately 48.6 billion m² (Building Energy Efficiency Policies in China—Executive Summary, July 2012, Global Building Performance Network. ISBN: 99-10-91655-01-9). Most of the existing buildings and 30% of the buildings under construction are high energy consumption structures. It is undoubted that a huge potential exists for thermal insulation materials in order for these buildings to achieve energy saving targets.

Objects constantly exposed to radiant energy, such as railway track, develop large thermal stresses which will shorten their working life. Reducing this temperature difference by coating with a thermal insulation material is a possible way to decrease the life cycle cost of these objects.

Central heat supply is provided to an area of 1.0108 billion m² in China in 2005 (Chinese Statistical Yearbook of 20054) and, in Beijing alone, the length of pipelines in the heat supply network exceeded 17,000 kilometers in 2008 (Beijing Development and Reform Commission, 2009). This kind of structures enclosing materials with a large temperature gradient with its immediate environment would have a huge demand for thermal insulation materials.

Conventionally, low thermal conductivity is considered as the most important factor in choosing a thermal insulation material. As still air or other gases have low thermal conductivity, most of the thermal insulation materials tend to have a very high void content such that the bulk of the thermal insulation material consists of small bubbles of air.

Due to the high porosity of traditional thermal insulation materials, such as aerated concrete block, foam plastics, expanded perlite, foam cement, expanded polystyrene, most of them are not expected to have sufficient mechanical strength to support a large load. The material will lose its function when subjected to any accidental physical or chemical attacks. As a result, most traditional thermal insulation materials are not durable especially under abrasion and adverse environmental conditions such as moisture and acid gases in the atmosphere. The temperature and relative humidity will also affect the thermal conductivity of the traditional thermal insulation materials. Once the temperature or the humidity exceeds an acceptable range, the thermal conduction of the material will increase dramatically. Flammability is another significant problem with existing thermal insulation materials. Protection is always needed on the surface of thermal insulation materials to resist fire or prevent the release of toxic vapors under high temperature. This incurs additional complexity and cost on the thermal insulation installation.

The most significant problem with traditional thermal insulation materials is their ineffectiveness in resisting radiant heat. The radiant heat, in the form of electromagnetic waves, will cause molecules to vibrate and thereby causes increase in temperature. The wavelengths responsible for heat from sunlight are from 400 nm to 25 μm. Most common thermal insulation materials are capable of absorbing and transferring 90 percent of the radiant energy. In any way, the radiant heat will generate on the surfaces of the traditional thermal insulation materials or be transferred through the materials from one side to the other. The only thing that the traditional thermal insulation can do is to reduce the efficiency of energy transfer across the material. So the tradition thermal insulation is, generally, a kind of passive method in heat resistance.

SUMMARY OF THE INVENTION

Figure 1:
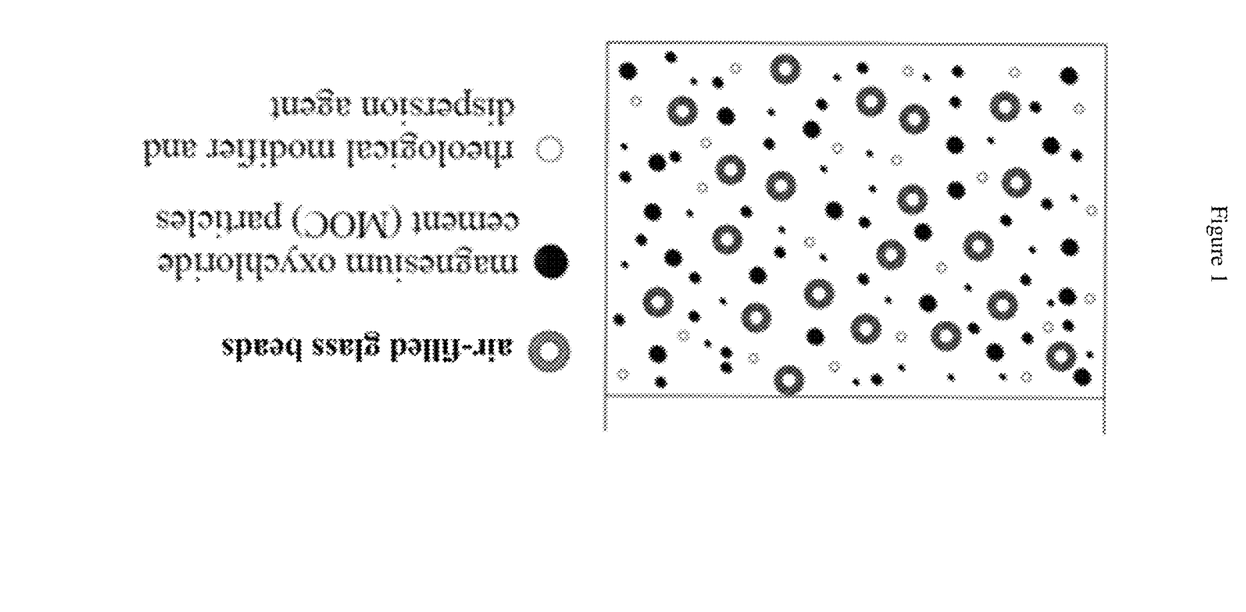
FIG. 1 shows a schematic diagram of a mixture comprising AGB and MOC particles.
Figure 2:
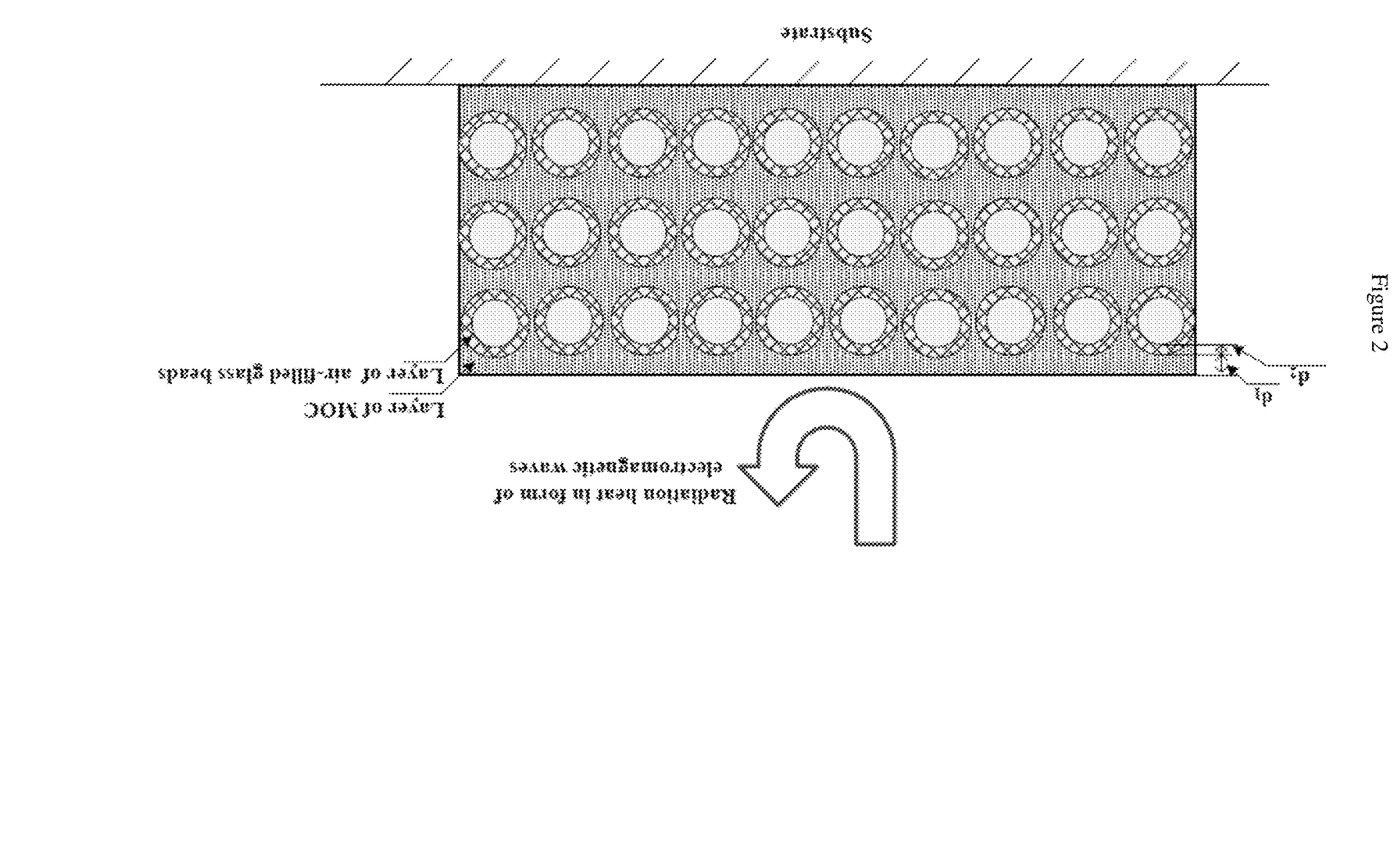
FIG. 2 shows a multi-layered structure of the present invention after application.

To overcome the limitations of the traditional thermal insulation materials, the present invention is developed based on the reflection theory with inorganic materials. This invention is directed to a material comprising air-filled glass beads (AGB) and magnesium oxychloride cement (MOC) particles which may contain one or more additives such as titanium dioxide powder, fly ash, pigment powders, and potassium dihydrogen phosphate ($KH_2PO_4$) or sodium dihydrogen phosphate ($NaH_2PO_4$) powder (FIG. 1). The MOC reaction product has a layer structure surrounding the shell of glass beads and hence forms a multi-layered structure after application (FIG. 2). If the thickness of two adjacent layers, $d_i$ and $d_j$, as well as their refractive indices $n_i$ and $n_j$ are carefully designed to satisfy the relationship of $n_i d_i + n_j d_j = \lambda_k/4$ to $2\lambda_k/2$, (Springer Handbook of Electronic and Photonic Materials, 2006, Springer) where $\lambda_k$ is the wave length of incident wave k, the radiant heat energy contained in the k wave will be highly reflected. The optimized values are the range of visible lights and infrared wave lengths, i.e. from 400 nm to 2.5 μm. With the multi-layered structure and the different desirable combination of $d_i$ and $d_j$ as well as $n_i$ and $n_j$, the majority of near-infrared waves and visible light waves will be reflected from the surface of the structure and the radiation heat carried by these waves prevented from transferring across the material. In addition, a combination of MOC, a well-known heat preservation material, and air-filled beads having low thermal conduction is expected to improve the thermal insulation properties of a material. Therefore thermal insulation is achieved by a combination of reflection, refraction, and dissipation.

The present material provides additional advantages such as a small thickness of 0.5 mm to 1.0 mm, insensitivity to high temperature, good bonding strength, and increased fire resistance in addition to thermal insulation.

DEFINITIONS AND ABBREVIATIONS

The following terms shall be used to describe the present invention. In the absence of a specific definition set forth herein, the terms used to describe the present invention shall be given their common meaning as understood by those of ordinary skill in the art.

As used herein, ASTM refers to American Society for Testing and Materials.

As used herein, d refers to thickness.

As used herein, $KH_2PO_4$ refers to potassium dihydrogen phosphate.

As used herein, AGB refers to air-filled glass beads.

As used herein, CFCP refers to control fiber cement plate.

As used herein, CB refers to coating with air-filled glass beads.

As used herein, CBT refers to coating with air-filled glass beads and titanium dioxide.

As used herein, CBY refers to coating with air-filled glass beads and yellow pigment.

As used herein, MgO refers to magnesium oxide.

As used herein, $MgCl_2$ refers to magnesium chloride.

As used herein, MOC refers to magnesium oxychloride cement.

As used herein, n refers to refractive index.

As used herein, $NaH_2PO_4$ refers to sodium dihydrogen phosphate.

As used herein, NIR refers to radiation in the near infra-red spectrum.

As used herein, PVC refers to polyvinyl chloride.

As used herein, $TiO_2$ refers to titanium dioxide.

As used herein, UV refers to radiation in the ultraviolet spectrum.

As used herein, VIS refers to radiation in the visible spectrum.

As used herein, $\lambda$ refers to wavelength.

DETAILED DESCRIPTION OF THE INVENTION

Figure 3:
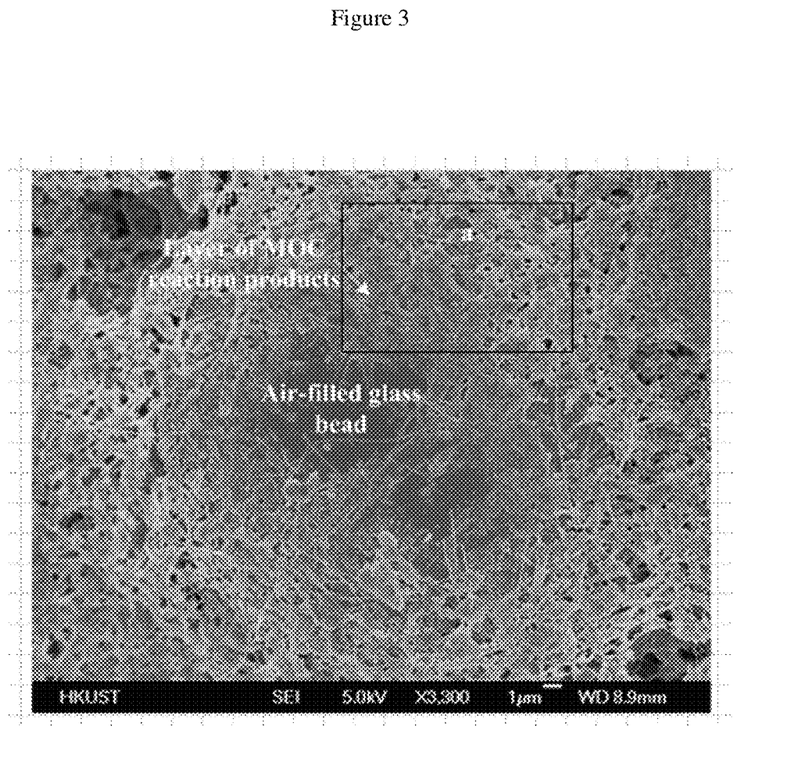
FIG. 3 shows AGB covered with MOC reaction products.
Figure 4:
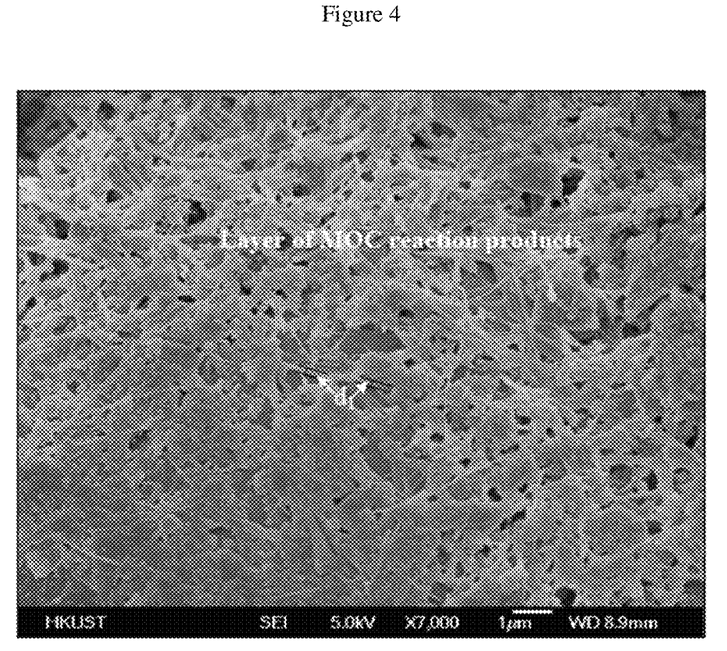
FIG. 4 shows layer of MOC reaction products with AGB beneath.
Figure 5:
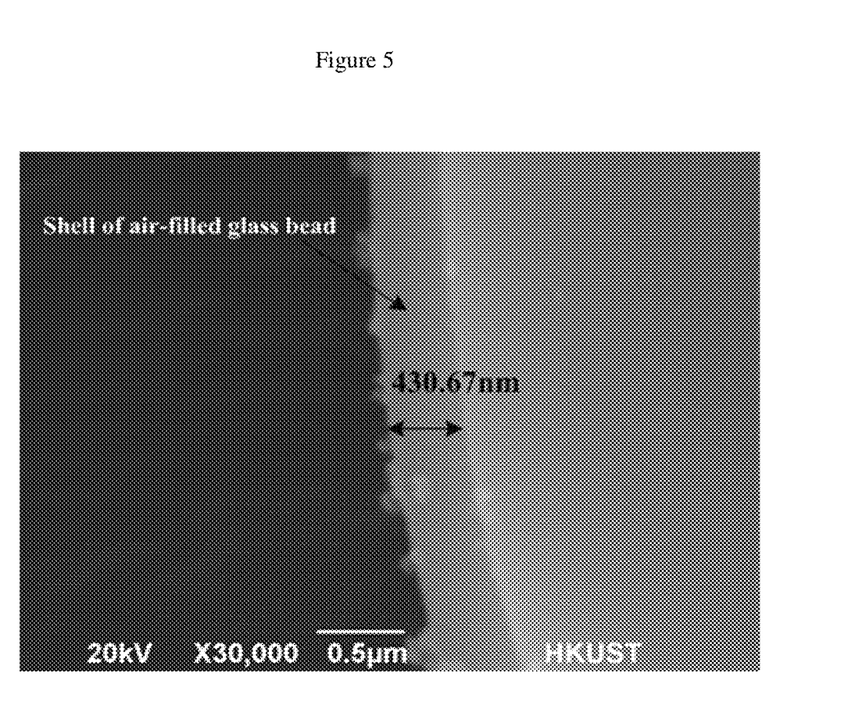
FIG. 5 shows the shell thickness of a typical AGB.

To overcome the limitations of the traditional thermal insulation materials, the present invention is developed based on the reflection theory. This invention is directed to a material comprising AGB and MOC particles which may contain one or more additives such as titanium dioxide powder, fly ash, pigment powders, and $KH_2PO_4$ or $NaH_2PO_4$ powder (FIG. 1). In one embodiment, the MOC act as a binding material for AGB and the additives to form a thin inorganic coating. Said material may form a multi-layered structure after application (FIG. 2). For instance, the thickness of the shell of AGB can range from 10 nanometers to 10 micrometers. In addition, the thickness of the reaction products of MOC can be optimized through the mix portion design. Moreover, it was found that the reaction product of the MOC has a fibrous network layered feature, for example, FIGS. 3 & 4. If the thickness of two adjacent layers, $d_i$ and $d_j$, as well as their refractive indices $n_i$ and $n_j$ are carefully designed to satisfy the relationship of $n_i d_i + n_j d_j = \lambda_k/4$ to $\lambda_k/2$, where $\lambda_k$ is the wavelength of incident wave k, the radiant heat energy contained in the k wave will be highly reflected. With the multi-layered structure and the different desirable combination of $d_i$ and $d_j$ as well as $n_i$ and $n_j$, the majority of infrared waves and visible light waves can be blocked. Hence, the heat transfer by radiation across the material will be drastically reduced. As shown in FIG. 4, the layer thickness of MOC reaction products ranges from 10 nanometers to 5 micrometers. In one embodiment, the thickness is 100 nm. Also, the thickness of the shell of AGB ranges from 10 nanometers to 10 micrometers. In one embodiment, the thickness is 431 nm as in FIG. 5. The refractive indices of MOC reaction products and air filled glass beads are 1.60-1.80 and 1.40-2.50, for example, 1.70 and 1.51, respectively. Hence, according to the equation, the calculated values fall well into the range of $\lambda_k/4$ to $\lambda_k/2$, where $\lambda_k$ is the wavelength of incident wave k. For example, shell thickness and refractive index of air filled glass beads are 431 nm and 1.51, respectively; while the thickness and refractive index of MOC reaction product layer are 100 nm and 1.70, respectively. Through equation calculation $(n_i d_i + n_j d_j)$, a value of 820.81 nm can be obtained, which suggests a large part of near-infrared wavelengths (e.g. from 1642 nm to 3283 nm) can be highly reflected. In addition, a combination of MOC, a well-known heat preservation material, and AGB having low thermal conduction is expected to improve the thermal insulation properties of a material. Therefore thermal insulation is achieved by a combination of reflection, refraction, and dissipation.

In one embodiment, the air-filled beads are made of glass or ceramic and have a density of 0.1 to 2.6 $g/cm^3$; they constitute up to 80% volume fraction of the material.

In one embodiment, said air-filled bead has a refractive index of 1.40-2.50, preferably 1.51.

In another embodiment, said air-filled bead has a shell thickness of 10 nanometers to 10 micrometers, preferably 431 nm.

In one embodiment, said MOC has a molar ratio of MgO to $MgCl_2$ of 9-17; and a weight ratio of water to particles of 0.3-0.9.

In another embodiment, said MOC has a refractive index of 1.60-1.80, preferably 1.70.

In a further embodiment, said MOC forms fibrous reaction products having its network layer thickness of 10 nanometers to 5 micrometers, preferably 100 nm.

In a further embodiment, said MOC contains one or more of 0-10 volume % of $TiO_2$, 0-50 volume % of fly ash, 0.1-5 volume % of $KH_2PO_4$ and 0.1-5 volume % of $NaH_2PO_4$.

In yet another embodiment, said pigment powders are iron dioxide and make up 0-20 volume % of the MOC.

In one embodiment, the present invention can be used in thermal insulation coatings in industrial and civil applications to conserve resource and energy.

The present material provides advantages such as a small thickness of 0.5 mm to 1.0 mm, insensitive to high temperature, good bonding strength, and increased fire resistance in addition to thermal insulation.

In one embodiment, the present invention is used for thermal insulation of structures for temporary or permanent sheltering of human beings such as residential and commercial buildings.

In another embodiment, the present invention is used in reducing the thermal stresses caused by radiant heat in an object such as railway tracks exposed to sunlight.

In a further embodiment, the present material is applied onto structures, such as pipelines of a heat supply network, so that materials enclosed within said structures can be maintained at a large temperature gradient with its immediate surroundings.

In one embodiment, the present material is applied onto an object or structure by brushing, spraying, scrape coating or other conventional coating methods.

The invention will be better understood by reference to the Experimental Details which follow, but those skilled in the art will readily appreciate that the specific experiments are provided only for illustrative purposes, and are not meant to limit the invention as described herein, which is defined by the claims that follow thereafter.

Throughout this application, various references or publications are cited. Disclosures of these references or publications are hereby incorporated in their entireties by reference into this application in order to more fully describe the state of the art to which this invention pertains. It is to be noted that the transitional term "comprising", which is synonymous with "including", "containing" or "characterized by", is inclusive or open-ended and does not exclude additional, un-recited elements or method steps.

Example 1

Figure 6:
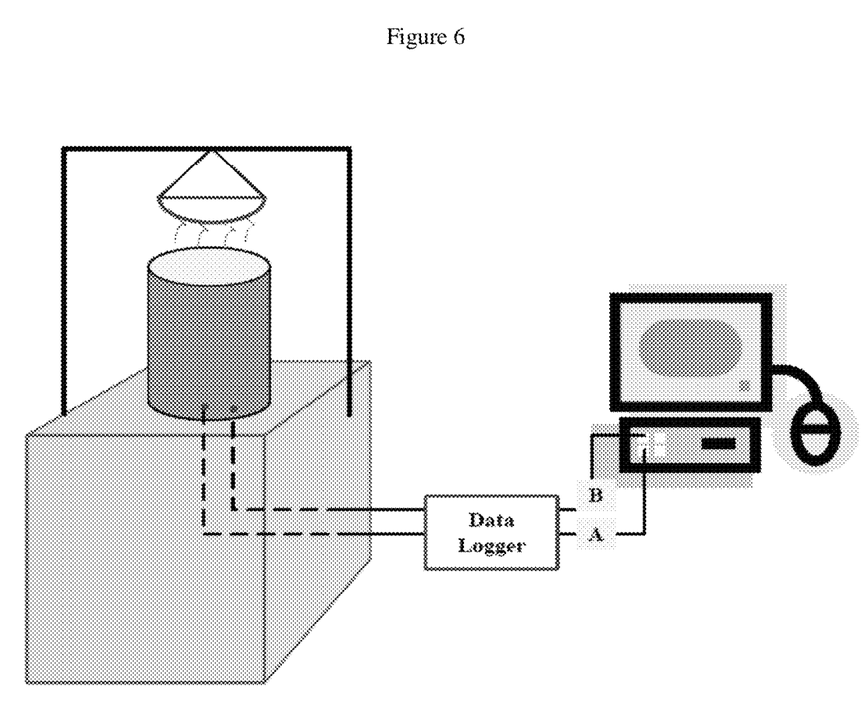
FIG. 6 shows a schematic diagram of heating test setup.
Figure 7:
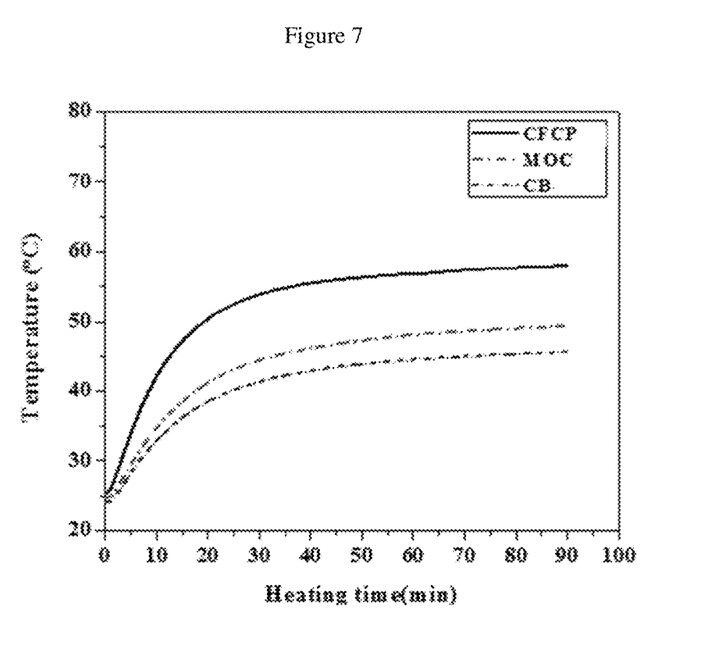
FIG. 7 shows the inner surface temperature comparison among CFCP without coating, fiber cement plate with MOC coating and fiber cement plate with an embodiment of present invention, CB.
Figure 8:
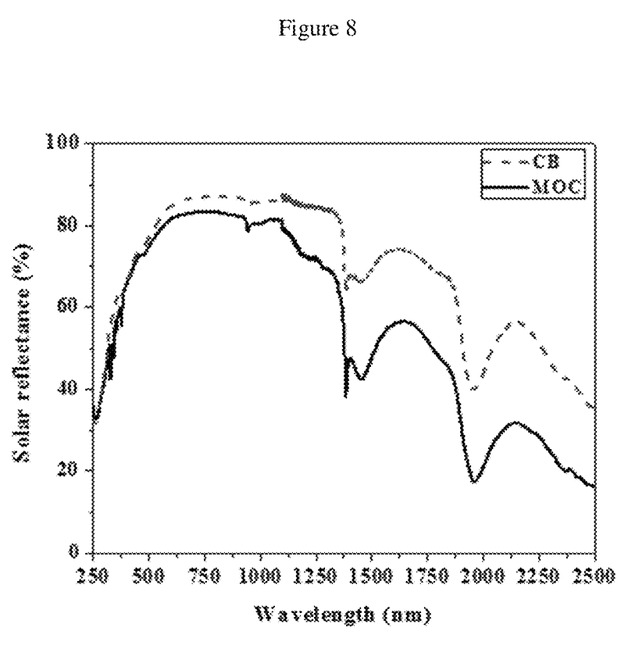
FIG. 8 shows the solar reflectance comparison between fiber cement plate with MOC coating and that with the present invention, CB.

The raw materials used are MgO, $MgCl_2$ emulsion, water, $KH_2PO_4$ and air-filled glass beads. MgO used was calcined magnesite powder with a purity of 94%. Magnesium chloride hexahydrate crystal ($MgCl_2.6H_2O$) with a purity of 98% was employed for making $MgCl_2$ solution. $KH_2PO_4$ in chemical grade was employed. AGE with density of 0.38 g/cm³ and mean particle size of about 40 μm were used. Refractive index of AGB is 1.51, and their typical wall thickness is around 431 nm. Tap water was used for coating mixing. The constituents of an embodiment of the present invention are shown in Table 1. Powders of MgO, and AGB were uniformly mixed together first. Then, this well mixed powder was further homogenously mixed with $MgCl_2$ solution that had $KH_2PO_4$ already dissolved. Fiber cement board that is a combination of cement and reinforcing fibers was used as coating substrate. By using scrape coating method, the present invention was applied onto the surface of a 200 mm×200 mm×8 mm fiber cement board at a thickness of about 0.50 mm. The heating test setup is shown in FIG. 6. A 275 W infrared radiation lamp was mounted at the top of a frame. A hollow PVC pipe (φ200 mm×~450 mm) with inner surface covered with silver foil paper was placed right under the lamp to direct the radiation to the specimen and to generate a region with homogeneous and steady temperature. A wooden box (500 mm×500 mm×500 mm) at the bottom of the setup was used for simulating the inside of a room under the exposure of sun. A specimen (200 mm×200 mm×8 mm) to be tested was placed on a square plate between the top opening of the box and the bottom edge of the hollow PVC pipe, separating the outside and the inside of the box. The other parts of the top surface of the box were covered with foam plastic and reflective tape to ensure that the heat flows to the inside of the box only through the specimen plate. For each test, two thermocouples were utilized to monitor the temperature change of inside surface (in the wooden box). The temperature data was recorded by a data logger controlled by a desktop computer. The experimental results are presented in FIG. 7. As can be seen from the figure, the invented coating CB demonstrates obviously lower inner surface temperature than both CFCP and MOC. The temperature differences between CB and CFCP is 12.39° C., and that between CB and MOC is 3.77° C. FIG. 8 shows the result of UV/VIS/NIR solar reflectance test conducted according to ASTM E1175-87(2009). It is observed that both visible light and near infrared light are greatly reflected by CB; moreover, CB demonstrates clearly higher solar reflectance in both VIS and NIR wavelength ranges than MOC. Other properties of the material in this embodiment such as surface drying time, pencil hardness, 168 h water resistance, and adhesion performance were measured. Surface drying time, pencil hardness and adhesion performance of the developed coating were measured according to ASTM C461-81, ASM D3363-05 and ASTM D4541-09e1, respectively. For water resistance test, fiber cement board with the developed coating was continuously soaked in water for 168 h. Surface appearance of soaked coating surface was observed. If there are no wrinkling, no bubbling, no delamination, then coating water resistance is regarded as good. The corresponding test results are listed in Table 2.

TABLE 1

Compositions of three coating materials (volume %)

| Series | | MgO | $MgCl_2$ | MAGB | $TiO_2$ | Yellow Pigment | $KH_2PO_4$ | Water | In total |
|---|---|---|---|---|---|---|---|---|---|
| Example1 | CB | 15.29 | 4.75 | 30.04 | — | — | 0.11 | 49.81 | 100 |
| Example2 | CBT | 19.84 | 6.16 | 20.33 | 0.94 | — | 0.14 | 52.59 | 100 |
| Example3 | CBY | 14.96 | 4.65 | 29.43 | — | 0.28 | 0.11 | 50.57 | 100 |

Note:
CB stands for coating with air-filled glass beads; CBT for coating with air-filled glass beads and titanium dioxide; and CBY for coating with air-filled glass beads and yellow pigment.

TABLE 2

Properties of three coating materials

| Series | | Surface drying time (h:min) | Pencil Hardness | Water resistance (168 h) | Adhesion performance (MPa) |
|---|---|---|---|---|---|
| Example 1 | CB | 1:58 | 1H | Good | 3.28 |
| Example 2 | CBT | 2:00 | >6H | Good | 2.94 |
| Example 3 | CBY | 1:47 | 2H | Good | 2.26 |
| Standard followed | | ASTM C461-81 | ASTM D3363-05 | — | ASTM D4541-09e1 |

Example 2

Figure 9:
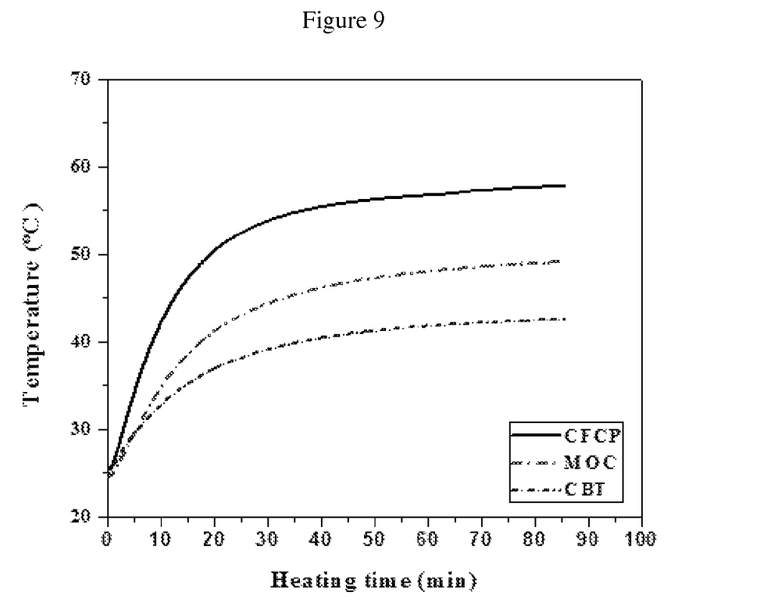
FIG. 9 shows the inner surface temperature comparison among CFCP without coating, fiber cement plate with MOC coating and fiber cement plate with an embodiment of the present invention, CBT.
Figure 10:
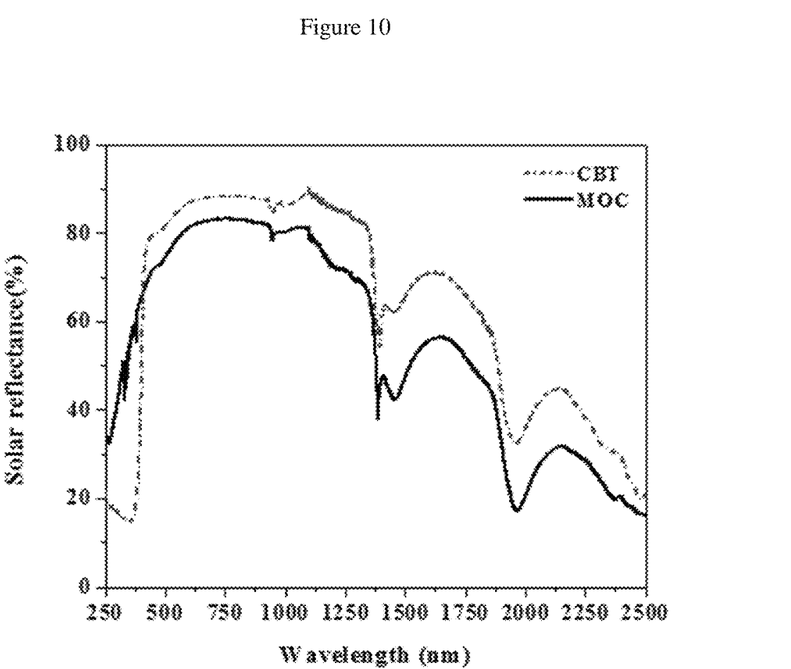
FIG. 10 shows the solar reflectance comparison between fiber cement plate with MOC and that with an embodiment of the present invention, CBT.
Figure 11:
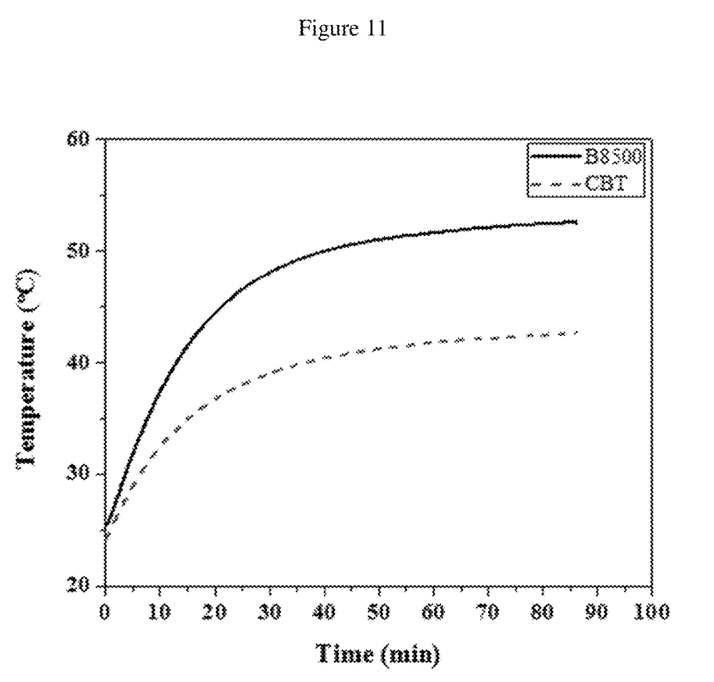
FIG. 11 shows the inner surface temperature comparison between fiber cement plate with an embodiment of the present invention, CBT, and that with commercial coating (B8500).

The raw materials used are MgO, $MgCl_2$ solution, water, $KH_2PO_4$, air-filled glass beads and titanium dioxide. MgO used was calcined magnesite powder with a purity of 94%. Magnesium chloride hexahydrate crystal ($MgCl_2.6H_2O$) with a purity of 98% was employed for making $MgCl_2$ solution. $KH_2PO_4$ in chemical grade was employed. AGB with density of 0.38 g/cm$^3$ and mean particle size of about 40 μm were used. Refractive index of AGB is 1.51, and their typical wall thickness is 431 nm. $TiO_2$ used was in rutile crystal form and had mean particle size of 0.41 μm. $TiO_2$ is a commonly used white pigment coating materials and is used for increasing coating viscosity and durability of this invention. The constituents of an embodiment of the present invention (CBT) are shown in Table 1. Powders of MgO, AGB and $TiO_2$ were uniformly mixed together first. Then, this well mixed powder was further homogenously mixed with $MgCl_2$ solution that had $KH_2PO_4$ dissolved. Fiber cement board that is a combination of cement and reinforcing fibers was used as coating substrate. By using scrape coating method, the present invention was applied onto the surface of a 200 mm×200 mm×8 mm fiber cement plate at a thickness of about 0.50 mm. The test methods used were same with that for example 1. The experimental results are shown in FIG. 9. As can be seen from the figure, the invented coating CBT demonstrates obviously lower inner surface temperature than both CFCP and MOC. The temperature difference between CBT and CFCP is 15.32° C., and that between CBT and MOC is 6.70° C. FIG. 10 shows the result of UV/VIS/NIR solar reflectance test conducted according to ASTM E1175-87 (2009). It is observed that both visible and NIR light are highly reflected by CBT; moreover, CBT demonstrates clearly higher solar reflectance in both VIS and NIR wavelength ranges than MOC. It should be noted that the lower solar reflectance of CBT in UV wavelength range is due to UV absorption by $TiO_2$. Other properties of the coating layer such as formability, surface drying time, pencil hardness, 168 h water resistance, and adhesion performance have been measured and the results are summarized in Table 2. Heating barrier performance between CBT and commercial solar reflectance coating product BOYSEN cool Shades Reflecting White B8500 produced in the Philippines were compared. Both coatings were applied on FCP at their optimized coating thickness. The optimized coating thicknesses for CBT and B8500 were 0.50 mm and 0.17 mm, respectively. It should be noted that once coating thickness of B8500 was larger than its optimized value, coating surface cracks would be obviously formed. FIG. 11 demonstrates inner surface temperature difference between CBT and B8500. As can be clearly seen from the figure, inner surface temperature of CBT is 9.8° C. lower than that with B8500, indicating superior good thermal insulation performance.

Example 3

Figure 12:
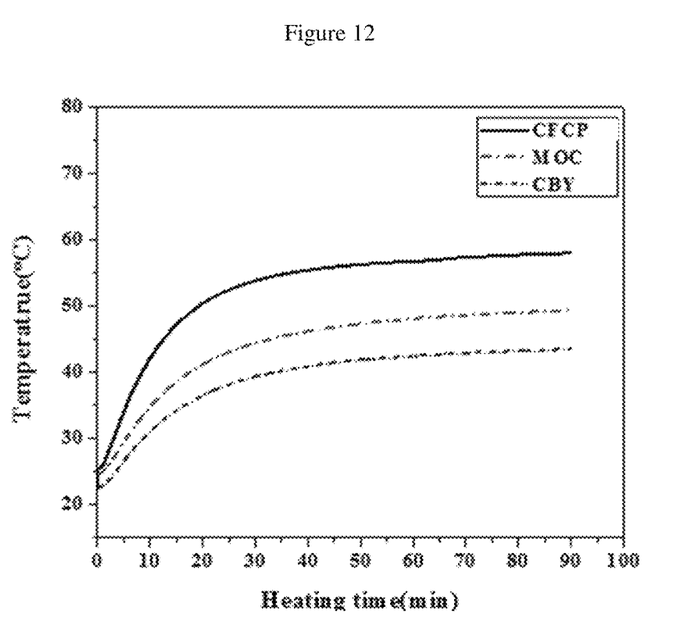
FIG. 12 shows the inner surface temperature comparison among CFCP without coating, fiber cement plate with MOC and fiber cement plate with an embodiment of the present invention, CBY.
Figure 13:
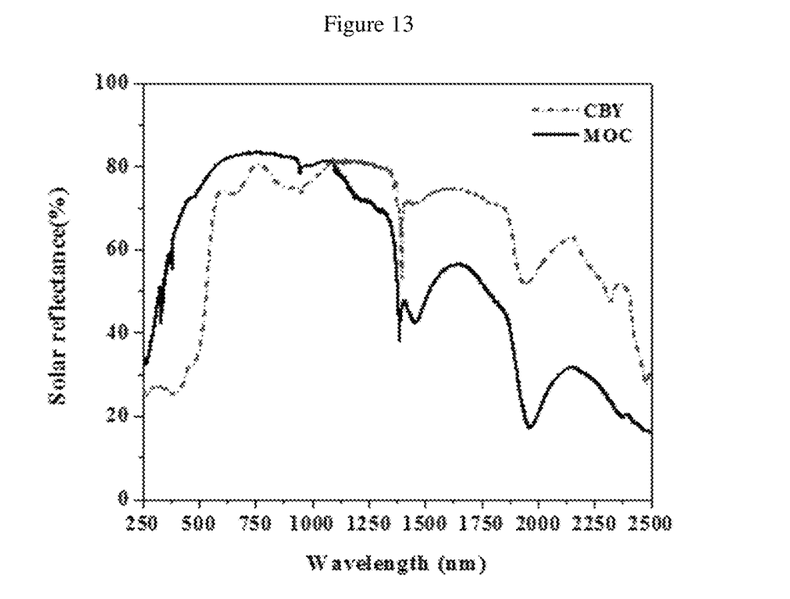
FIG. 13 shows the solar reflectance comparison between fiber cement plate with MOC and that with an embodiment of the present invention, CBY.

The raw materials used are MgO, $MgCl_2$ solution, water, $KH_2PO_4$, AGB and yellow pigment. MgO used was calcined magnesite powder with a purity of 94%. Magnesium chloride hexahydrate crystal ($MgCl_2.6H_2O$) with a purity of 98% was employed for making $MgCl_2$ solution. $KH_2PO_4$ in chemical grade was employed. AGB with density of 0.38 g/cm$^3$ and mean particle size of about 40 μm were used. Yellow pigment used had $Fe_2O_3$ as main component and is for aesthetic purposes in this invention. Tap water was used for coating mixing. The proportion of each constituent in an embodiment of the present invention (CBY) is shown in Table 1. Powders of MgO, AGB and yellow pigment were uniformly mixed together first. Then, this well mixed powder was further homogenously mixed with $MgCl_2$ solution that had $KH_2PO_4$ dissolved. Fiber cement board that was a combination of cement and reinforcing fibers was used as coating substrate. By using scrape coating method, the present invention was applied onto the surface of a 200 mm×200 mm×8 mm fiber cement plate at a thickness of about 0.50 mm. The test methods used were same as examples 1 and 2. The experimental results are shown in FIG. 12. As can be seen from the figure, the invented coating CBY demonstrates obviously lower inner surface temperature than both CFCP and MOC. The temperature difference between CBY and CFCP is 14.41° C., and that between CBY and MOC is 5.94° C. FIG. 13 shows the result of UV/VIS/NIR solar reflectance test conducted according to ASTM E1175-87 (2009). It is observed that CBY demonstrates clearly higher solar reflectance in NIR wavelength range. The lower solar reflectance in UV and VIS wavelength ranges could be due to light absorption by the yellow pigment used. Other properties of the coating layer such as surface drying time, pencil hardness, 168 h water resistance, and adhesion performance have been measured and the results are summarized in Table 2.

REFERENCES

1. Lang Siwei, China Academy of Building Research, 2007.
2. ASTM C461-81: Standard test methods for mastics and coatings used with thermal insulation.
3. ASTM D3363-05: Standard test method for film hardness by pencil test.
4. ASTM D4541-09e1: Standard test method for pull-off strength coating using portable adhesion testers.
5. ASTM E1175-87(2009): Standard test method for determining solar or photopic reflectance, transmittance, and absorptance of materials using a large diameter integrating sphere.

What is claimed is:

1. A composition for a thermal insulation material, comprising:
   a magnesium oxychloride cement MOC comprising magnesium oxide, magnesium chloride, and water, wherein the magnesium oxychloride cement comprises a molar ratio of the magnesium oxide to the magnesium chloride of 9 to 17, and a weight ratio of the water to the magnesium oxide and the magnesium chloride of 0.3 to 0.9 for forming a plurality of MOC fibrous product layers having a first refractive index of 1.60 to 1.80;
   a plurality of air-filled beads, wherein each of the air-filled beads comprises a shell thickness in a range of 10 nm to 10 μm, a density of 0.1 to 2.6 g/cm$^3$, and a second refractive index of 1.40 to 2.50; and
   0.1-10 volume % titanium dioxide ($TiO_2$), 0.1-50 volume % fly ash, 0.1-20 volume % pigment, 0.1-5 volume % potassium dihydrogen phosphate ($KH_2PO_4$) and 0.1-5 volume % sodium dihydrogen phosphate ($NaH_2PO_4$);

wherein the air-filled beads constitute a volume fraction of the thermal insulation material for forming the MOC fibrous product layers with a network layer thickness in a range of 10 nm to 5 μm; and wherein the MOC fibrous product layers having the first refractive index in the range of 1.60 to 1.80 and the network layer thickness in the range of 10 nm to 5 μm are adjacent to the air-filled beads having the shell thickness in the range of 10 nm to 10 μm and the second refractive index of 1.40 to 2.50, providing that the thermal insulation material comprises a multi-layered structure for reflecting incident electromagnetic wave.

2. The composition of claim 1, wherein said thermal insulation material reflects the incident electromagnetic wave, k, according to the equation:

$$n_i d_i + n_j d_j = \frac{\lambda_k}{4} \text{ to } \frac{\lambda_k}{2},$$

where $d_i$ denotes the network layer thickness, $n_i$ denotes the first refractive index, $d_j$ denotes the shell thickness, $n_j$ denotes the second refractive index, and $\lambda_k$ is a wavelength of said wave.

3. The composition of claim 1, wherein said wave is selected from visible, near infrared, middle infrared, far infrared and other heat waves.

4. The composition of claim 1, wherein said pigment is iron dioxide or reflective ones.

5. The composition of claim 1, wherein the first refractive index of the MOC fibrous product layer is 1.70.

6. The composition of claim 1, wherein said air-filled beads constitute 80% volume fraction of the thermal insulation material and comprise air-filled beads made of glass.

7. The composition of claim 1, wherein the second refractive index of the air-filled beads has a value of 1.51.

8. The composition of claim 1, wherein the shell thickness of the air-filled beads has a value of 431 nm.

9. The composition of claim 1, wherein said composition is applied onto an object or a structure including a railway track, a shelter for animals or human, or a pipeline for transporting a gas or liquid.

10. The composition of claim 1, wherein the shell thickness has a value of 431 nm, and the second refractive index has a value of 1.51, the composition further comprises 15.29 vol % of the magnesium oxide, 4.75 vol % of the magnesium chloride, and 0.11 vol % of potassium dihydrogen phosphate.

11. A composition for a thermal insulation material, comprising: 14.96-19.84 vol % of magnesium oxide, 4.65-6.16 vol % of magnesium chloride, 20.33-30.04 vol % of air-filled glass beads, titanium dioxide, 0.11-0.14 vol % of potassium dihydrogen phosphate, and 49.81-52.59 vol % of water, wherein the air-filled glass beads comprise a refractive index of 1.51 and a wall thickness of 431 nm, providing that the thermal insulation material comprises a multi-layered structure for reflecting incident electromagnetic wave.

12. A composition for a thermal insulation material, comprising:

a magnesium oxychloride cement MOC comprising magnesium oxide, magnesium chloride, and water, wherein the magnesium oxychloride cement comprises a molar ratio of the magnesium oxide to the magnesium chloride of 9 to 17, and a weight ratio of the water to the magnesium oxide and the magnesium chloride of 0.3 to 0.9 for forming a plurality of MOC fibrous product layers having a first refractive index of 1.60 to 1.80;

a plurality of air-filled beads, wherein each of the air-filled beads comprises a shell thickness having a value of 431 nm, a density of 0.1 to 2.6 g/cm³, and a second refractive index of 1.51; and 15.29 vol % of the magnesium oxide, 4.75 vol % of the magnesium chloride, and 0.11 vol % of potassium dihydrogen phosphate;

wherein the air-filled beads constitute a volume fraction of the thermal insulation material for forming the MOC fibrous product layers with a network layer thickness in a range of 10 nm to 5 μm; and wherein the MOC fibrous product layers having the first refractive index in the range of 1.60 to 1.80 and the network layer thickness in the range of 10 nm to 5 μm are adjacent to the air-filled beads having the shell thickness in the range of 10 nm to 10 μm and the second refractive index of 1.40 to 2.50, providing that the thermal insulation material comprises a multi-layered structure for reflecting incident electromagnetic wave.

13. The composition of claim 12, wherein said air-filled beads constitute 80% volume fraction of the thermal insulation material and comprise air-filled beads made of glass.

* * * * *